United States Patent [19]

Long

[11] 4,112,122

[45] Sep. 5, 1978

[54] PRESERVATION PROCESS

[75] Inventor: Dennis James George Long, Brighton, England

[73] Assignee: BP Chemicals Limited, London, England

[21] Appl. No.: 793,745

[22] Filed: May 4, 1977

[30] Foreign Application Priority Data

May 19, 1976 [GB] United Kingdom ............... 20639/76
Nov. 29, 1976 [GB] United Kingdom ............... 49608/76

[51] Int. Cl.$^2$ ............................................. A21D 2/14
[52] U.S. Cl. ........................................ 426/19; 426/25; 426/335; 426/532; 426/549; 426/555; 426/653; 426/646; 426/801
[58] Field of Search ................. 426/19, 25, 321, 335, 426/532, 549, 555, 556, 653, 646, 801, 9, 554

[56] References Cited

U.S. PATENT DOCUMENTS

| | | | |
|---|---|---|---|
| 2,154,449 | 4/1939 | Hoffman et al. | 426/532 |
| 3,008,986 | 11/1961 | Hyson | 426/653 |
| 3,057,731 | 10/1962 | Froman | 426/9 |
| 3,485,638 | 12/1969 | Benson | 426/335 |
| 3,600,198 | 8/1971 | Gonthier et al. | 426/335 |
| 3,899,594 | 8/1975 | Nickerson et al. | 426/321 |

*Primary Examiner*—Raymond N. Jones
*Assistant Examiner*—Esther M. Kepplinger
*Attorney, Agent, or Firm*—Brooks, Haidt, Haffner & Delahunty

[57] ABSTRACT

Foodstuffs, especially bread, can be preserved against the growth of microorganisms such as mould growth and rope formation by adding to the foodstuffs an acid propionate salt.

7 Claims, No Drawings

PRESERVATION PROCESS

The present invention relates to a method of inhibiting the growth of harmful micro-organisms, for instance, bacteria and fungi in foodstuffs and other organic material susceptible thereto.

Microbiological deterioration of bread and bread products is well known. The wastage of bread due to moulds and bacterial organisms has been considerable. This is basically due to the speed of production, rapid cooling and the tendency to produce softer bread which gives rise to marginally higher moisture content in the bread. Additionally, moisture retention is enhanced by the current trends in the packaging of sliced wrapped bread. This in turn renders the bread susceptible to attack by moulds and bacteria.

Various methods have hitherto been used to inhibit the growth of harmful micro-organisms. The primary consideration for the desired additive being that it attacks the micro-organism responsible without being toxic to human beings. Examples of additives used hitherto with varying degrees of success include the acetates and diacetates of sodium. Propionates of sodium and calcium have also been claimed and described in British Patent Specification Serial No. 488,560 (Ward Baking Company). Since the principal active constituent is believed to be the acid component, the use of fully neutralised salts results in the need for adding a larger amount of the salt than should be necessary based on the acid content of the salt. It has now been found that by using the acid salts, the desired level of inhibition activity can be achieved using a relatively smaller proportion of the acid salt.

Accordingly, the present invention is a method of inhibiting the growth of harmful micro-organisms in footstuff susceptible thereto comprising incorporating therein an acid propionate salt in an amount of between 0.01 and 1.0% by the dry weight of the foodstuff.

According to a preferred embodiment, the present invention is a method of inhibiting rope formation and mould growth in bread comprising incorporating therein an acid propionate salt in an amount of between 0.01 and 0.4% by the dry weight of the flour. The method of the present invention is particularly suitable for inhibiting rope formation and mould growth in enzyme leavened or chemically aerated bread.

Other foodstuffs that may be treated according to the present invention include products such as cakes, pastry mixes, biscuits, flour, starches, precooked foods such as sausages and meat pies and baby foods.

The acid propionate salts according to the present invention are the acid salts of propionic acid and at least one cation selected from ammonium, sodium, potassium, calcium and magnesium such that the ratio of acid to the cation in the salt is in the range of 2:1 to 4:1 on a chemical equivalent basis. Preferred acid salts are sodium dipropionate, ammonium dipropionate, potassium dipropionate, calcium tetrapropionate and magnesium tetrapropionate The acid propionates are suitably prepared by adding a full propionate salt to propionic acid and water. For example a 70% solution of sodium acid propionate may be prepared by adding sodium propionate to propionic acid in water.

Alternatively a solution may be prepared by the addition of solutions of sodium hydroxide or carbonate to propionic acid. For example 95 pts. of 42% w/w aqueous solution of sodium hydroxide was added to 148 pts. of stirred, cooled propionic acid to yield 243 pts. of a 70% solution of sodium dipropionate.

The acid propionate salts are preferably added in an amount of between 0.01 and 0.4% by the dry weight of the foodstuff treated, but not so as to contravene any legal restrictions on the use of preservatives in foodstuffs.

The acid propionate salt may be added as a solid or as an aqueous solution to the ingredients before, during or after the mixing of the ingredients depending upon the foodstuff being treated. Furthermore, if the inhibitor is to be incorporated in the processing of bread, it is preferably added to the water used in making dough from flour rather than to the solid components of the bread mix in the bread making process.

The acid propionate salts are more water soluble than the corresponding neutral propionates. This enables solutions to be prepared and used which are sufficiently concentrated to provide significant economic advantage over the solid neutral propionate salt or aqueous solutions of the neutral propionate salt. Solubilities of the calcium and sodium acid and neutral propionates in water are given below:

| | | |
|---|---|---|
| solubility at 20° C | sodium propionate | 99.5g/100g water |
| | sodium dipropionate | 233g/100g water |
| solubility at 25° C | calcium propionate | 39g/100g water |
| | calcium tetrapropionate | 48g/100g water |

The invention is further illustrated with reference to the following Examples.

EXAMPLES 1–3

Using a Chorleywood Breadmaking Process (C.B.P.) bread recipe, doughs were made up containing 6, 9 and 12 oz of 70% sodium dipropionate solution per sack of flour. In all cases, the mould inhibitors were added to the doughing water. Three dough pieces, moulded to the 4 piece shape, were produced from each dough and proved for a constant time of 47 min prior to baking. The average proof height, oven height, oven spring and loaf volume were determined. A small scale organoleptic test was carried out using a panel of 10 persons who were asked to rate loaves from the various treatments for odour on a scale from not evident = 0 to extremely evident = 5. The mould-free shelf life of the various breads was determined by cutting the loaves into five thick slices and exposing each cut surface to the atmosphere for 5 min to allow natural contamination with moulds to occur prior to wrapping. The number of mouldy cut surfaces was determined twice daily during storage at 27° C (80° F) and an approximate mould-free shelf life estimated. The results from this test are given in Table 1.

By way of comparison with the above Examples 1–3, tests (a), (b) and (c) were carried out using bread with no inhibitor and with calcium propionate as inhibitor. The results are shown in Table 2.

Table 1

| Treatment | Proof Ht. (cm) | Oven ht. (cm) | Oven Spring (cm) | Loaf vol. (ml) | Average panel rating for odour | Approx. mould-free shelf life (days at 27° C) |
| --- | --- | --- | --- | --- | --- | --- |
| 1. Na. acid prop. 6* oz/sack** | 10.75 | 16.00 | 5.25 | 2870 | 0.5 | 2.75 |
| 2. Na. acid prop. 9* oz/sack** | 9.5 | 15.75 | 6.25 | 2863 | 1.2 | 3.75 |
| 3. Na. acid prop. 12* oz/sack** | 9.4 | 14.80 | 5.40 | 2807 | 2.3 | 4.00 |

*weight of a 70% aqueous solution.
*sack contained 280 lbs. of flour.

Table 2

| Treatment | Proof Ht. (cm) | Oven ht. (cm) | Oven Spring (cm) | Loaf vol. (ml) | Average panel rating for odour | Approx. mould-free shelf life (days at 270° C) |
| --- | --- | --- | --- | --- | --- | --- |
| (a) Untreated control | 11.0 | 15.75 | 4.75 | 2909 | 0.1 | 2.25 |
| (b) Solid Ca. prop. 9 oz/sack** | 10.0 | 15.60 | 5.60 | 2844 | 0.6 | 3.50 |
| (c) Solid Ca. prop. 14 oz/sack** | 9.75 | 15.50 | 5.75 | 2812 | 3.1 | 4.75 |

**sack contained 280 lbs. of flour.

At all levels the inhibitors caused under-proof in the fixed proof time employed by the oven spring was increased over that of the untreated control. Loaf volume was reduced as the amount of inhibitor present increased. The reduction in volume using 14 oz/sack of calcium propionate was similar to that when 12 oz/sack of sodium dipropionate was used.

a scale from not evident = 0 to extremely evident = 5. The results from these tests are summarised in Table 3.

Again by way of comparison, Examples 4 – 9 were repeated but adding solid calcium propionate to the dry ingredients instead of the sodium dipropionate solution being added to the dough making liquor. The results are shown in Table 4.

Table 3

| Treatment | Average loaf specific volume | Average panel rating for odour | No. of loaves out of 22 mouldy after | | | | | Approx. mould-free shelf life (days at 27°) |
| --- | --- | --- | --- | --- | --- | --- | --- | --- |
| | | | 3¾ days | 4 days | 4¾ days | 5¾ days | 6¾ days | |
| 4. Na. acid prop. 9** oz/sack | 3.5 | 1.3 | 0(0) | 0(0) | 2(1) | 7(1) | 14(1) | 4.50 |
| 5. Na. acid prop. 14** oz/sack | 3.5 | 1.8 | 0(0) | 0(0) | 0(0) | 2(0) | 9(0) | 5.25 |
| 6. Na. acid prop. 7** oz/sack | 3.5 | 1.0 | 0(0) | 2(2) | 9(6) | 19(9) | 22(15) | 3.75 |
| 7. Na. acid prop. 12** oz/sack | 3.5 | 1.4 | 0(0) | 0(0) | 16(7) | 19(13) | 22(14) | 4.25 |
| 8. Na. acid prop. 7** oz/sack | 3.4 | | 4(2) | 5(2) | 16(3) | 22(7) | 22(18) | 3.25 |
| 9. Na. acid prop. 12** oz/sack | 3.5 | | 0(0) | 0(2) | 6(8) | 19(10) | 19(15) | 4.00 (3.50) |

**Weight of 70% aqueous solution per sack weighing 280 lbs.

Table 4

| Treatment | Average loaf specific volume | Average panel rating for odour | No. of loaves out of 22 mouldy after | | | | | Approx. mould-free shelf life (days at 27°) |
| --- | --- | --- | --- | --- | --- | --- | --- | --- |
| | | | 3¾ days | 4 days | 4¾ days | 5¾ days | 6¾ days | |
| d. Ca. prop. 9 oz/sack (280lb) | 3.4 | 1.2 | 0(0)* | 2(0) | 8(2) | 16(3) | 20(5) | 3.75 |
| e. Ca. prop. 14 oz/sack (280lb) | 3.5 | 1.5 | 0(0) | 0(0) | 0(0) | 5(0) | 12(1) | 5.00 |
| f. Ca. prop. 9 oz/sack (280lb) | 3.5 | 1.0 | 0(0) | 3(5) | 7(9) | 20(16) | 21(19) | 3.75 |
| g. Ca. prop. 14 oz/sack (280lb) | 3.5 | 1.7 | 0(0) | 0(0) | 8(4) | 15(11) | 18(15) | 4.50 |
| h. Ca. prop. 9 oz/sack (280lb) | 3.5 | | 2(2) | 4(2) | 11(6) | 20(11) | 22(14) | 3.50 |
| i. Ca. prop. 14 oz/sack (280lb) | 3.6 | | 0(0) | 0(0) | 6(0) | 12(1) | 16(3) | 4.25 |

*Figures in brackets show cut surfaces mouldy.

EXAMPLES 4 – 9

Additional experiments were carried out in a commercial bakery on three different occasions to compare the mould-free shelf life of sliced and bagged standard bread containing 70% sodium dipropionate solution. In each experiment the sodium dipropionate solution was part of the liquor used to make up the dough. Additional yeast was added to overcome any effects on loaf volume, i.e. 8 oz/sack for 7-9 oz/sack levels of both inhibitors and 12 oz/sack for 12-14 oz/sack levels of both inhibitors.

In each experiment, 22 sliced and bagged loaves per treatment were held in an incubator at 27° C (80° F) and examined at intervals for the numbers of loaves mouldy both on the outside and cut surfaces. Loaf volume measurements were carried out on four loaves per treatment. In the initial experiments, organoleptic tests were also carried out using a panel of 30 persons who were asked to rate the odour present in the various breads on The specific volume of the breads did not vary greatly in any of the tests, indicating that the additional yeast in the recipes was successful in maintaining volume. It is also clear from the data shown in Tables 1 and 2 that the use of acid propionates results in an improved oven spring in comparison with the full neutral salts.

The organoleptic panel was unable to detect any significant difference in odour between calcium propionate and 70% sodium dipropionate when used at similar levels in bread. It would appear that these two materials have a very similar odour threshold.

The results from the storage tests suggest that at similar concentrations the 70% sodium dipropionate formulation is more effective than solid calcium propionate in extending mould-free shelf life.

I claim:

1. A method of inhibiting the growth of micro-organisms in foodstuffs susceptible thereto comprising incorporating therein an acid salt of propionic acid and at least one cation selected from the group consisting of ammonium, sodium, potassium, calcium and magnesium such that the ratio of the acid to the cation in the salt is in the range of 2:1 to 4:1 on a chemical equivalent basis in an amount of between 0.01 and 1.0% by the dry weight of the said foodstuff.

2. A method according to claim 1 comprising inhibiting rope formation and mould growth in bread incorporating in the bread an acid propionate salt in an amount of between 0.01 and 0.4% by the dry weight of the flour.

3. A method according to claim 2 wherein the bread is an enzyme leavened or chemically aerated bread.

4. A method according to claim 1 wherein the foodstuff is selected from cakes, pastry mixes, biscuits, flours, starches, sausages, meat pies and baby foods.

5. A method according to claim 1 wherein the acid propionate salt is selected from sodium dipropionate, ammonium dipropionate, potassium dipropionate, calcium tetra propionate and magnesium tetra propionate.

6. A method according to claim 1 wherein the acid propionate salt is added as an aqueous solution.

7. A process according to claim 2 wherein the acid propionate salt is added to the water used in the making of dough from flour in the bread making process.

* * * * *

UNITED STATES PATENT AND TRADEMARK OFFICE
CERTIFICATE OF CORRECTION

PATENT NO. : 4,112,122

DATED : September 5, 1978

INVENTOR(S) : DENNIS JAMES GEORGE LONG

It is certified that error appears in the above–identified patent and that said Letters Patent are hereby corrected as shown below:

Col. 4, Table 2, under the last heading, "(days at 270°C) should read --(days at 27°C)--.

Signed and Sealed this

Twenty-seventh Day of March 1979

[SEAL]

Attest:

RUTH C. MASON
*Attesting Officer*

DONALD W. BANNER
*Commissioner of Patents and Trademarks*